United States Patent [19]
Wright et al.

[11] Patent Number: 5,553,760
[45] Date of Patent: Sep. 10, 1996

[54] LADDER SHIELD

[76] Inventors: Kevin J. Wright, 2480 Winthrop St., North Dighton, Mass. 02764; Stephen T. Wright, 14 Highland Ave., Barrington, R.I. 02806

[21] Appl. No.: 500,338

[22] Filed: Jul. 10, 1995

[51] Int. Cl.$^6$ ........................................................ B60R 9/00
[52] U.S. Cl. ............................ 224/316; 224/488; 224/309
[58] Field of Search .............................. 224/316, 309, 224/310, 315, 917.5, 488, 493, 533, 534, 537, 324, 545, 547, 567, 568; 296/180.1, 93, 209

[56] References Cited

U.S. PATENT DOCUMENTS 3,514,023   5/1970   Russell et al. ........................ 224/316

FOREIGN PATENT DOCUMENTS 3000166   7/1981   Germany ............................. 224/316
3017358  12/1981   Germany ............................. 224/316
2076761  12/1981   United Kingdom .................. 224/316

Primary Examiner—David J. Walczak
Attorney, Agent, or Firm—Robert J. Doherty

[57] ABSTRACT

An air shield for partially enclosing the forward end of a ladder such that the ladder can more easily and efficiently be carried on the top of vehicles which shield includes an aerodynamic outer shell and an interior of yieldable cushioning material which reduces ladder rattle and vibration.

9 Claims, 4 Drawing Sheets

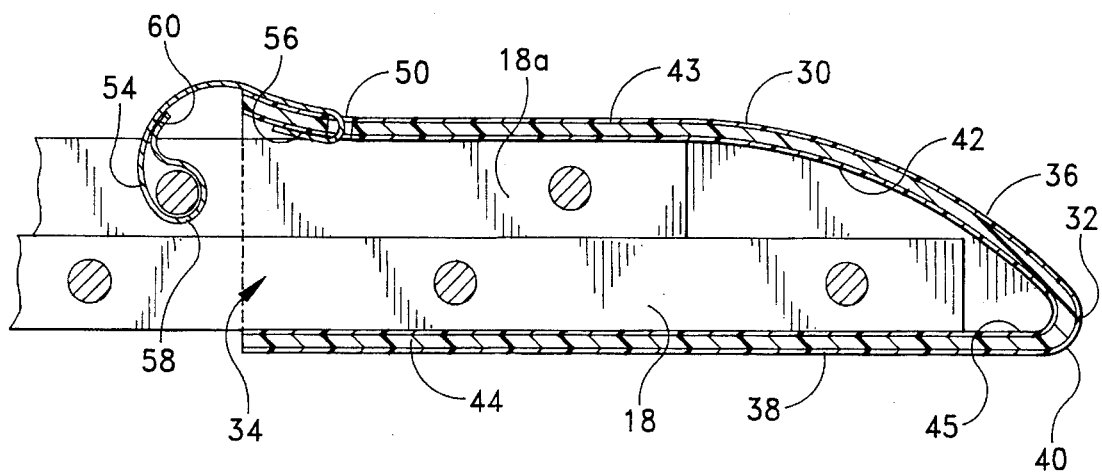
FIG. 3
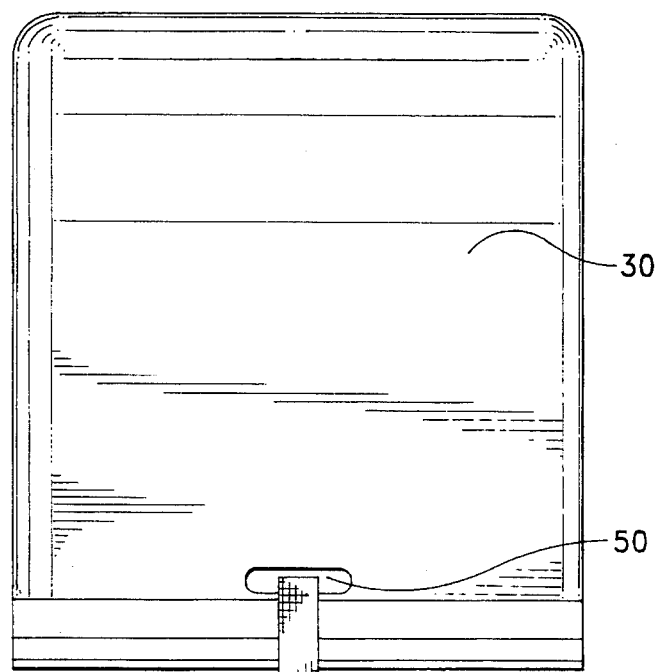
FIG. 4
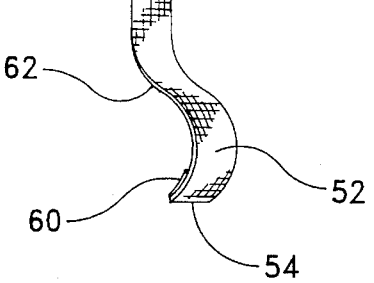

LADDER SHIELD

BACKGROUND AND OBJECTS OF THE INVENTION

This invention relates to a device for covering a portion of a ladder and more specifically relates to a device for covering the forward end of a ladder when transported on the top or side of a vehicle such that both the tendency of a ladder to rattle and its wind resistance is reduced.

A recurrent problem among professional tradesmen as well as anyone who transports ladders either on the top or side of their vehicle is that when traveling the ladders tend to increase frictional drag of the overall vehicle profile and thus reduce gas mileage and also tend to become unstable in the wind and thus increase the likelihood that the ladder will undesirably shift position and cause an obstruction or attention distraction of the driver and thus lead to a potential for an accident. This situation also leads to the vibration of the ladder with resulting irritating noise which is especially true with the most common type of ladders transported from job to job, namely, conventional two-part extension ladders, wherein essentially two equal ladder portions are removably engaged to each other and able to slide relative to one another to various fixed positions to increase the ladder's overall effective length. This noise resulting from rattling is especially true with aluminum ladders but is also present with ladders formed from other materials such as Fiberglas and wood and is a constant source of irritation and distraction to the driver and passengers being transported in the vehicle.

Obviously it would be desirable to be able to reduce this vibration and wind noise both from a safety factor and from the standpoint of energy conservation and general well being to those involved. Accordingly, the overall object of the present invention is the provision of a ladder shield adapted to be fastened to the forward portions of such ladders whereby an aerodynamic face is presented to the wind to reduce the wind effect upon the ladder and thus reduce the overall drag coefficient of the vehicle and its fuel efficiency as well as reducing the wind caused relative movement of the ladder vis-a-vis the vehicle and thus the noise produced thereby especially in two-piece extension ladders.

A still further object of the present invention is the provision of a air shield as above indicated wherein the relative dimensioning of such device enables some stabilizing frictional pressure to be brought upon the component parts of the two pieces of an extension ladder so as to additionally reduce vibration and rattle-type movement normally produced by such in this additional manner.

These and other objects of the present invention are accomplished by an air shield for the forward end of a ladder when such ladder is transported by a vehicle, such shield including a hollow body in turn having connected top and bottom walls forming an envelope for receipt of such ladder forward end, said body also having forward and rear ends each of a transverse extent slightly greater than the transverse extent of the ladder wherein the body rear end is open for receipt of the ladder forward end and the body forward end terminating in a closed wall of a height materially less than that of said rear end and wherein said body top wall upwardly rearwardly tapers in a longitudinal direction between said forward and rear body ends, said body including an outer surface which is smooth and rigid and further including attachment means for attaching said shield to the ladder wherein said attachment means includes an elongated flexible element having a loop at one end thereof and adapted to extend about a rung of the ladder located rearwardly of said body rear end and means for connecting said element to said body at the other end thereof.

Other objects, features and advantages of the invention shall become apparent as the description thereof proceeds when considered in connection with the accompanying illustrative drawings.

DESCRIPTION OF THE DRAWINGS

In the drawings which illustrate the best modes presently contemplated for carrying out the present invention:

FIG. 3 is a side sectional view taken along the line 3—3 of FIG. 2;

FIG. 4 is a top elevational view of the air shield itself without the ladder positioned therein.

DETAILED DESCRIPTION OF THE INVENTION

Figure 1:
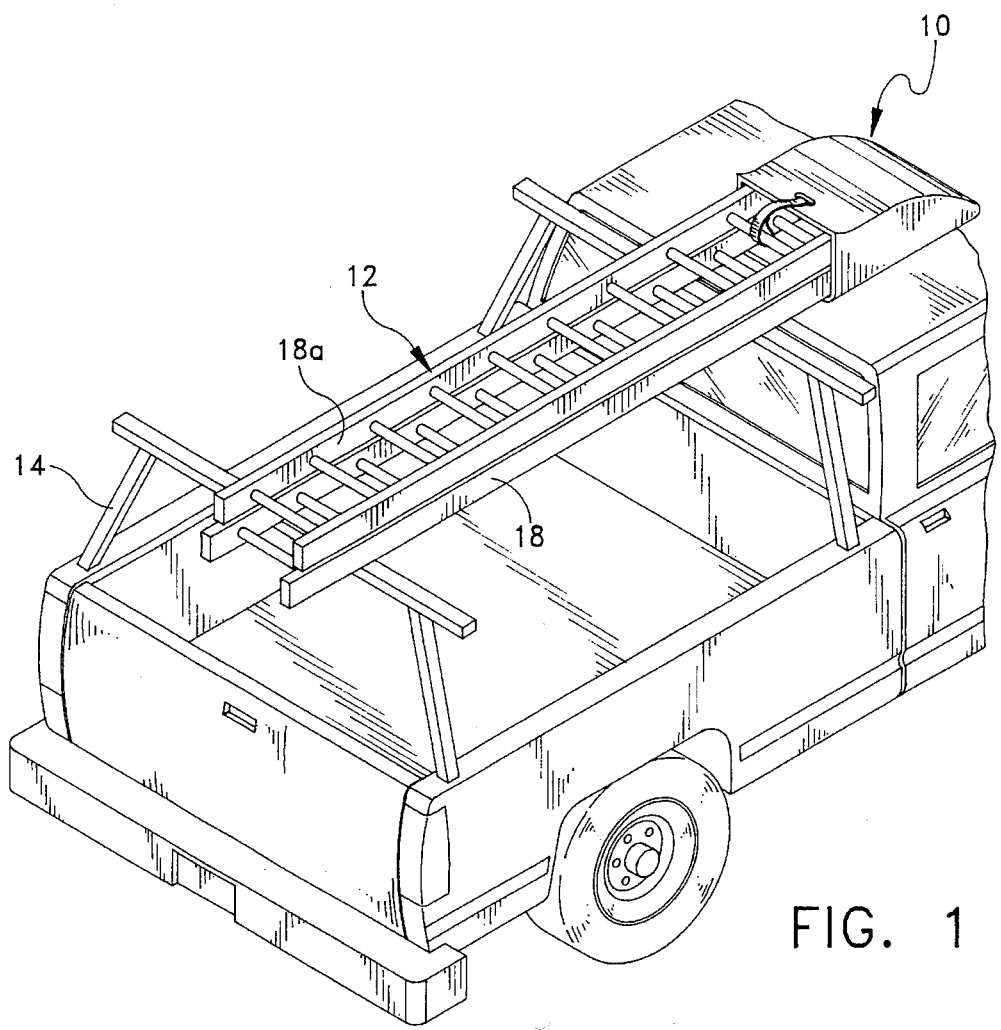
FIG. 1 is a perspective view showing a portion of a pickup-type truck vehicle in which a standard extension ladder is positioned on a rack at the top surface thereof and in which the shield of the present invention is positioned at the forward end thereof.
Figure 2:
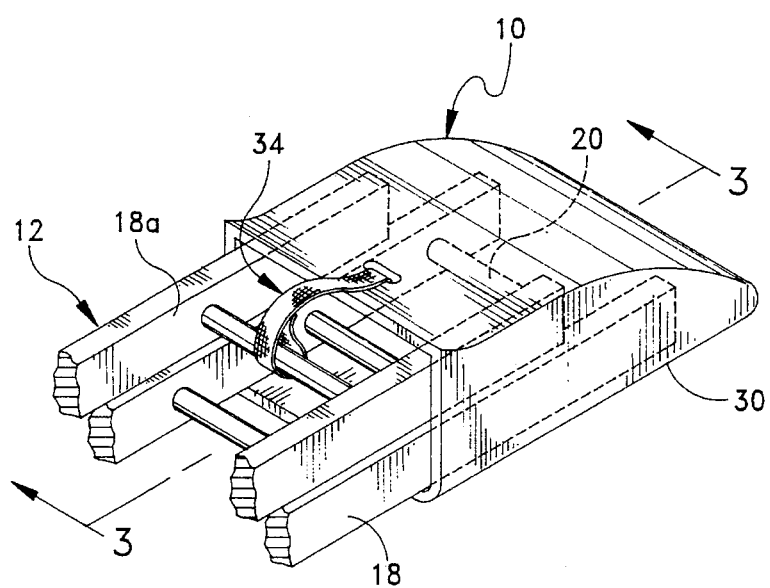
FIG. 2 is an enlarged perspective view of the forward end of the ladder and air shield of the present invention but additionally showing the relative positioning of the forward end portions of the two part extension ladder assembly within the open end of the shield.

Referring to the drawings and particularly FIG. 1 thereof, the shield 10 of the present invention is shown in its use position on the forward end of a two-part extension ladder 12 of conventional construction. The ladder 12 in turn is supported upon a longitudinally-spaced pair of racks 14 upwardly projecting from the bed of pickup truck or the like. It should be brought out that the ladder would be positioned in other orientations with respect to the vehicle on which it is supported whether that vehicle is a pickup truck, van, automobile or the like. It should also be brought out that the ladder 12 may be suitably secured to the rack 14 by any conventional means such as tying by rope or use of elastic cords provided with hook elements on the opposite ends thereof.

The ladder 12 although depicted of two-part conventional extension ladder design may be of one-piece construction or for that matter of some non-conventional construction so long as the latter includes laterally separated pairs of rails 18 connected by transverse members such as the rungs 20. In the specific ladder shown in the drawings, a first set of rails 18 are shown lowermost and superimposed thereon is a second set of rails 18a. With such extension ladders, conventional means are provided to alternately fix the position of the rails sets 18 and 18a longitudinally with respect to each other such as locking devices (not shown), and it should be brought out that the normal orientation of the rails 18 and 18a with respect to each other wherein the uppermost rails or ladder portions at the forward end thereof are disposed proximate to but downwardly or rearwardly removed from the front terminal end of the first set of rails 18 for a purpose which will be hereinafter more fully explained. Also this is the normal orientation of extension ladder portions with respect to each other when they are transported.

Referring now to FIGS. 1–4 of the drawings, the construction of the shield 10 is best illustrated. Such shield 10 is of general aerodynamic design and includes a body 30 having a forward end 32 which is of closed construction and a rear open end 34 forming an entrance such that the shield may be inserted over the forward end of the ladder or vice versa. The body 30 includes an upper wall 36 and a lower wall 38 connected at the forward end 32 in a reduced height forward wall 40 which is of relatively pointed or aerodynamic design, that is, the top wall 36 preferably gradually moves downwardly from approximately its mid point towards the forward end of the shield 32, and thus not only imparts aerodynamic design to the overall shield 10 but also as best illustrated in FIG. 3 provides a reduced height section 42 proximate the forward end of the shield such that the lower rails 18 may contact inner portions of the top wall 36 to provide an additional stabilizing and anti-rattle contact line between the shield and the forward end of the ladder—in this case, the lower rails 18.

The top and bottom walls 36 and 38 are preferably formed from a smooth, rigid plastic resinous material such as ABS, polypropylene, polyethylene and the like so as to form a hard impact resistant shell 43 which generally is the outside surface of the top and bottom walls 36, 38 and the inner surface of the shield, that is, the inner surfaces of the top and bottom walls 36, 38 respectively, are preferably provided with a layer of compressible material 44 such as foam resinous material which adheres to the inside surfaces of the top and bottom walls 36 and 38 as by heat adhesion, adhesive or the like. Those inner surfaces may terminate in a skin 45 which is integral with the inner surface 44 as may be inherent in the molding process or may be a separate layer similar to the form that the shell 43 preferably takes. The importance of this feature being that the inner surface 44 preferably imparts some cushioning to the ladder. In fact, the skin 45 depicted need not be present or could even be separate element attached to layer in any suitable manner dictated by material choices and the like. The purpose of the compressible inner surface 44 is such that contact between such and the latter 12, that is, the upper and lower rail components 18 and 18a thereof, will be somewhat vibrationally damped or cushioned so that the rail components of a two-part extension ladder will not only be compacted into a single unit,but also that rattle or vibration noises and wear forces will not be as readily set up between the shield 10 and the ladder itself. Such not only reduces the noise from vibration between the two-part extension ladder components but also the noise between the extension ladder and the shield itself and thus enhances the overall objects of the present invention.

Generally, it is desirable to provide a shield that is approximately 20 inches in width and 16 inches in length and of a height at the open rear 34 thereof of approximately 7¾ inches. Such measurements accommodate standard commercial-type two-part extension ladders formed of aluminum and Fiberglas. It should be noted and as best illustrated by FIG. 3 that the top wall 36 moves forwardly from its open rear end 34 approximately mid point of its full extent and then laterally downwardly dips and, accordingly, provides the full height at that mid-point portion thereof in which the dual thickness of the superimposed rails 18 and 18a exist at the forward end of the ladder. In addition, the rear portion of the top wall 36 is provided with an opening 50 approximately centrally thereof and of a lateral width to accommodate a strap 52. The strap 52 is generally formed of a fabric material and includes opposed ends 54 and 56. One of the ends 56 may be permanently attached to the underside of the upper wall 36 as by conventional means such as adhesive connection or the use of a threaded fastener or the like and the other end 54 is capable of terminating in a loop 58 such that the loop can pass around at least one of the ladder rungs 20 and in this way anchor the shield 10 to the ladder. Such end 54 may be provided with a Velcro-type hook and loop connection means 60 wherein the underside of the terminal portion of the end 54 is releasably connected to a companion pad 62 of such material on the underside portion of the strap.

Figure 5:
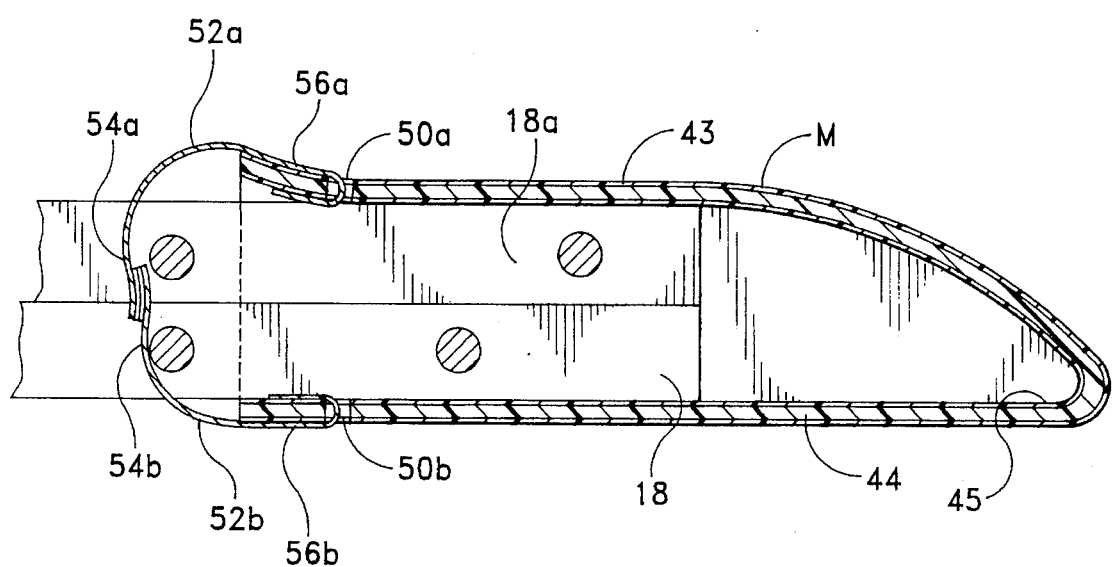
FIG. 5 is a side sectional view similar to FIG. 3 but showing the two-piece ladder with the rails aligned at their terminal ends.

FIG. 5 shows an alternate arrangement wherein the first and second rails 18, 18a are generally superposed so that their front ends are even, that is, the first rail does not extend forward to touch the forward end 32 of the body 30. In the view, an alternate strap or tie down arrangement is also shown wherein upper and lower straps 52a and 52b are shown which in turn include opposed ends 54a, 56a and 54b and 56b respectively. The ends 56a and 56b may be permanently attached to the underside of the upper wall 36 as previously brought out with respect to FIG. 3 with the straps 52a and 52b passing through the openings 50a and 50b and the other ends 54a and 54b may be provided with connection means 60, Also conventional connection means such as a hook and eye (not shown) may be utilized—the important feature being that enough strap length is available so as to provide a firm connecting and anchoring system between the shield 10 and the ladder 12, Also the strap 52 (also 52a and 52b) may be normally detached or separate from the shield and simply passed through the opening 50 (also 50a and 50b) in the upper wall 36 and thence around one of more of the rungs and then fastened either by a Velcro-type or belt buckle type fastening means, In addition, the rear terminal portion of the upper wall 36 may be upwardly flared to provide a secondary upper wall 66 which not only provides greater initial access for placing the ladder into the open end 34 or vice versa placing the shield 10 over the open forward end of the ladder and also provides a smoothing aerodynamic effect as well as providing desirable space between the top of the ladder 12 and the underside of the secondary top wall 66 so that the strap or other fastening means may be more easily connected through the opening 50 (also 50a, 50b).

Figure 6:
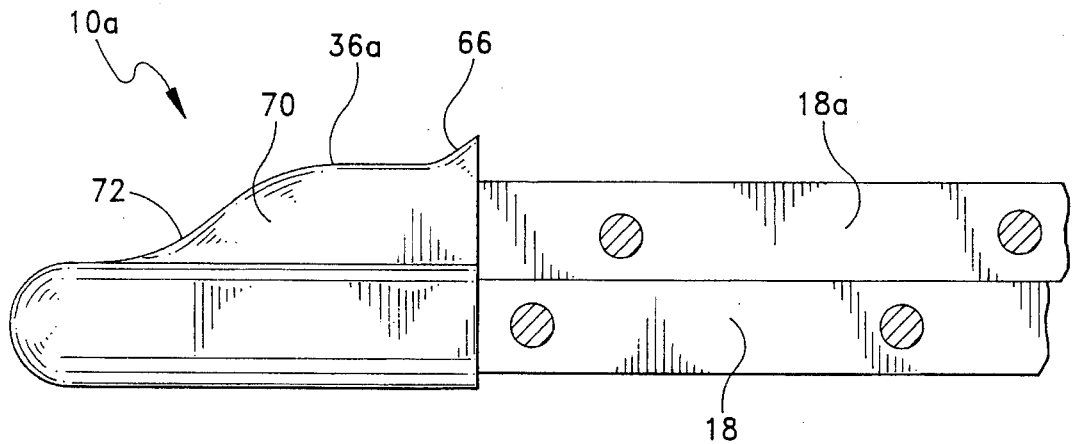
FIG. 6 is a side elevational view of another form of the shield shown in receipt of the front end of an extension ladder.
Figure 7:
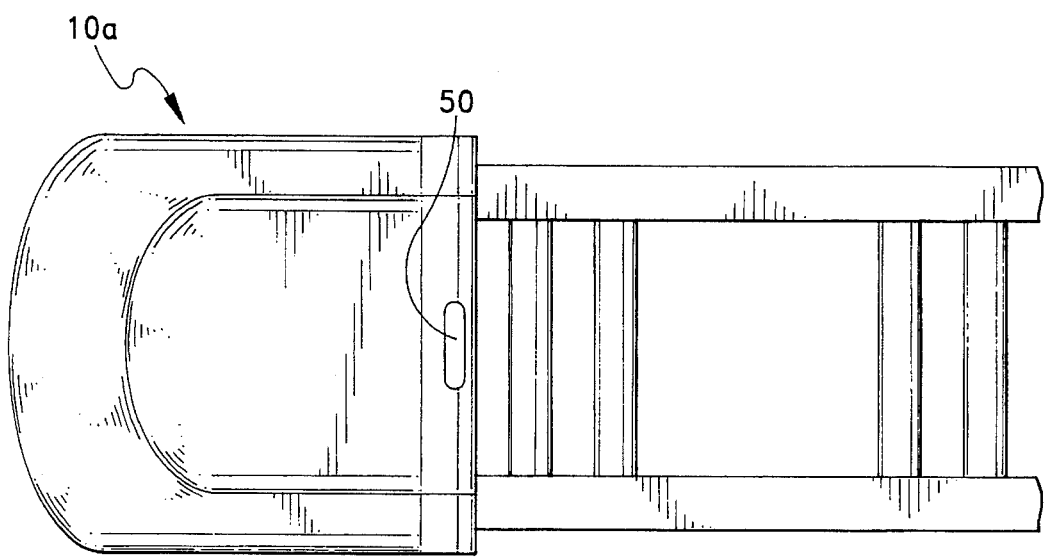
FIG. 7 is a top view of FIG. 6.

Turning now to FIGS. 6 and 7 of the drawings, an alternate embodiment of the shield is depicted at 10a. Such is of a similar shape but includes an upper wall 36a with a bulbous shaped wall portion 70 which is slightly narrower than that of wall 36 by about twice the width of the standard ladder rail 18a such that the uppermost rail of the two-part ladder 12 extends into or is pocketed by the bulbous wall. The forward end 72 of the bulbous wall merges with the upper wall about the midpoint M of the overall length such that such merger forms an area equivalent to the reduced height portion 42 described in the previous embodiment so that the upper ladder part rails 18a contact the inside of the shield 10a at that point. Naturally, the remaining interior portions of the shield 10a therebelow that point extend forwardly thereof and thus permit the lower rails 18 to extend thereinto as with the previous embodiment. Also, the opening 50 in the upwardly flared secondary upper wall 66 may also be similarly provided.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described.

What is claimed is:

1. An air shield for attachment to a forward end of a generally longitudinally extending ladder having a forward end and a transverse extent when said ladder is transported by a vehicle, said shield including a hollow body and having connected top and bottom walls forming an envelope for receipt of said ladder forward end, said body also having forward and rear ends each of a transverse extent slightly greater than the transverse extent of a ladder wherein the body rear end is open for receipt of said ladder forward end and the body forward end terminates in a closed wall of a height materially less than a height of said rear end and wherein said body top wall upwardly rearwardly tapers in a longitudinal direction from said forward end to said rear end, said body including an outer surface which is smooth and rigid and further including attachment means for attaching said shield to said ladder wherein said attachment means includes an elongated flexible element having a loop at one end thereof and adapted to extend about a rung of the ladder located rearwardly of said body rear end when said shield is attached to said ladder and means for connecting said flexible element to said body at the other end thereof.

2. The shield of claim 1, said attachment being a strap.

3. The shield of claim 2, said strap having mutual connection means at the opposite ends thereof.

4. The shield of claim 2, said strap having loop means including Velcro-type quick disconnecting means on the said one end thereof and connected to said shield at the other end thereof.

5. The shield of claim 1, said body top and bottom walls are vertically spaced from each other at said open rear end a distance slightly greater than the dimensional height of said ladder.

6. The shield of claim 1, said shield body includes an inner surface having portions which are adapted to be yieldable and compressible upon contact with said ladder.

7. The shield of claim 6, said body inner surface includes a layer of compressible foam material for contact with said ladder forward end.

8. The shield of claim 1, said body top wall includes an additional upwardly flared secondary area proximate said open end, and wherein said flexible element other end is connected to said shield in said secondary area.

9. The shield of claim 1, wherein the ladder adapted for use therewith is a standard two-part extension ladder and wherein said body top and bottom walls are vertically spaced from each other at said open rear end a distance approximately equal to a combined height thickness of said ladder part is and the vertical spacing of said body top and bottom walls is approximately equal to one half the height thickness of said ladder parts at a point proximal the closed front end of said body.

* * * * *